United States Patent [19]
Hedley et al.

[11] Patent Number: 5,313,566
[45] Date of Patent: * May 17, 1994

[54] COMPOSITE IMAGE GENERATION WITH HIDDEN SURFACE REMOVAL USING A SINGLE SPECIAL EFFECT GENERATOR

[75] Inventors: David J. Hedley, Abbots Barton, England; James B. Pearman, Glendale, Calif.

[73] Assignee: Sony United Kingdom Ltd., Staines, United Kingdom

[*] Notice: The portion of the term of this patent subsequent to Sep. 3, 2008 has been disclaimed.

[21] Appl. No.: 20,186

[22] Filed: Feb. 16, 1993

Related U.S. Application Data

[63] Continuation of Ser. No. 695,400, May 3, 1991, abandoned.

[30] Foreign Application Priority Data

Jul. 3, 1990 [GB] United Kingdom ............... 9014782

[51] Int. Cl.$^5$ ............................................. G06F 3/14
[52] U.S. Cl. .................................. 395/119; 395/121; 348/584
[58] Field of Search ................... 395/119, 120–122, 395/163; 340/734, 729, 747; 358/22, 22 PIP, 180, 182, 183

[56] References Cited
U.S. PATENT DOCUMENTS

| | | | |
|---|---|---|---|
| 4,684,990 | 8/1987 | Oxley | 358/183 |
| 4,855,812 | 8/1989 | Rokuda et al. | 358/22 |
| 4,953,107 | 8/1990 | Hedley et al. | 340/747 |
| 5,046,165 | 9/1991 | Pearman et al. | 358/183 |

FOREIGN PATENT DOCUMENTS 0199489 10/1986 European Pat. Off.
0360576 3/1990 European Pat. Off.

OTHER PUBLICATIONS

Computers and Graphics vol. 13, No. 2, 1989, Headington Hill Hall, Oxford pp. 207–216; Theoharis et al: Polygon Rendering on a Dual-Paradigm parallel processor parg. 5.1; figure 9.

Patent Abstracts of Japan vol. 13, No. 357 (P915) Aug. 10, 1989 & JP-A-1 116 888 (Tamura Electric Works) May 9, 1989.

*Primary Examiner*—Heather R. Herndon
*Assistant Examiner*—Michael Smith
*Attorney, Agent, or Firm*—William S. Frommer; Alvin Sinderbrand

[57] ABSTRACT

A method of generating an output video signal includes processing two or more input digital video signals so as to manipulate images that they represent and combining the processed signals to form the output video signal, which represents a composite image in which the manipulated images appear to fly through one another. In a first pass, a digital video effect generator (1) is supplied (4) with one of input video signals and is responsive to data (5) representing at least the manipulation to which the image represented by that one input signal is to be subjected to process that one input signal to subject the image represented thereby to the manipulation intended for that image. The processed signal resulting from the first pass is recorded (VTR1). In at least one subsequent pass, the generator 1) is supplied with the other or another of the input video signals and is responsive to data representing the manipulations to which the images represented by all of the input signals are to be subjected to process the other input signal so as to subject the image represented thereby to the manipulation intended for that image so as to crop or remove from the manipulated image any one or more portions thereof to be hidden in the composite image. The processed signal resulting from the at least one subsequent pass is keyed (16) into the recorded signal resulting from the previous pass.

12 Claims, 8 Drawing Sheets

COMPOSITE IMAGE GENERATION WITH HIDDEN SURFACE REMOVAL USING A SINGLE SPECIAL EFFECT GENERATOR

This application is a continuation of application Ser. No. 07/695,400, filed May 3, 1991, now abandoned.

BACKGROUND OF THE INVENTION

1. Field of the Invention

This invention relates to the generation of video signals, and is more particularly concerned with the generation of a video signal which represents a composite image and is formed by combining plural digital input video signals.

2. Description of the Prior Art

In the art of creating digital video effects, a requirement may arise to create an effect in which two or more images or pictures appear to fly through one another in three-dimensional space. For example, referring to FIG. 1 of the accompanying drawings, a requirement may exist to move three individual pictures P1, P2 and P3 about a display screen S, for example a display screen of a cathode ray tube, so that they appear to fly though one another. FIG. 1 shows the resultant composite image or picture as displayed on the screen S as frozen for a particular instant in time when all three of the pictures P1, P2 and P3 intersect one another, and FIGS. 2, 3 and 4 show, on a reduced scale, the parts of the pictures P1, P2 and P3 that are displayed at that particular instant.

A known technique for creating such an effect will now be described with reference to FIG. 5 of the accompanying drawings. The technique employs three separate digital video effect (DVE) generators—also known as digital multi effect (DME) generators—DME1, DME2 and DME3. Three conventional digital video signals S1, S2 and S3, each comprising a series of samples representing successive picture cells (pixels), are supplied to the DME generators DME1, DME2 and DME3, respectively. The signals S1, S2 and S3 represent the pictures (planes) P1, P2 and P3, respectively, prior to manipulation, that is to say while they are still conventional pictures, namely undistorted and occupying the whole of a screen. The DME generators DME1, DME2 and DME3 process the signals S1, S2 and S3, respectively, so as to manipulate ( crop, reduce in size, rotate, shear, etc.) the pictures (planes) that they represent, on a field by field basis, to produce processed signals on video busses VB1, VB2 and VB3 that represent the manipulated pictures P1, P2 and P3. These processed signals, if viewed, would each comprise a respective one of the pictures P1, P2 and P3, each as shown in FIG. 1 except that it would be seen in full ( rather than having parts hidden by the other pictures), each picture being keyed (inset) into a neutral (for example, plain blue or black) background picture B corresponding to the full size of the screen S.

The video busses VB1, VB2 and VB3 are connected to respective inputs of a combiner CB, which combines together the three processed signals from the DME generators DME1, DME2 and DMEB. The combiner CB cannot simply mix the three processed signals since this would result in the parts of each of the pictures P1, P2 and P3 that should be invisible (hidden) being mixed with, rather than concealed by, the pictures that should be shown as being in front of them. To achieve the desired concealment, the combiner CB controls the combination of the signals on the video busses VB1, VB2 and VB3 by using information supplied to the combiner from Z-busses ZB1, ZB2 and ZB3 which extend from the DME generators DME1, DME2 and DME3 to the combiner. The information on the Z-busses ZB1, ZB2 and ZB3 represents, for each pixel of the signals on the video busses VB1, VB2 and VB3, the displacement behind the plane of the screen (depth) of that pixel of the associated picture, namely the position of that pixel in a Cartesian coordinate system in which the X and Y axes lie on the screen and the Z axis is orthogonal to the screen. The combiner CB compares the depth information on the Z-busses ZB1, ZB2 and ZB3 on a pixel by pixel basis and selects for output that pixel having the smallest value of Z, that is the pixel that should be closest to the viewer. That is, based on the depth information on the Z-busses ZB1, ZB2 and ZB3, the combiner performs the required hidden surface removal.

The technique described above is subject to two disadvantages. The first is that it necessitates the use of three DME (DVE) generators. This imposes a large cost penalty because DME generators are expensive even for conventional definition television systems, and even more so in the case of high definition television (HDTV) systems.

The second disadvantage is degradation of the quality of the composite picture along the edges where the individual pictures meet. This is due to the fact that the switching between the pictures is controlled, as explained above, by the depth information, and the depth information is generated at the sampling (pixel) frequency whereby the above-mentioned edges become jagged. This will now be explained in more detail with reference to FIG. 6 of the accompanying drawings, which shows a case similar to that of FIG. 1, but somewhat simpler in that only two pictures (planes), PA and PB, are combined, the two planes intersecting along an edge or boundary p1-p2 whereby the abovementioned problem of jaggedness occurs at that edge. The problem arises due to the spatial resolution of the pictures PA and PB. In this regard, the individual pictures PA and PB are represented by digital video signals which comprise samples representing respective cells (pixels) of the picture. That is, each picture can be considered to comprise an orthogonal array or grid of pixels, each horizontal row thereof being centred on a horizontal scanning line and the horizontal rows being spaced apart by the distance between the scanning lines. (See, in this regard, FIG. 7 of the accompanying drawings, which shows part of a composite picture like that of FIG. 6, but with an edge or boundary B1, corresponding to the edge p1-p2, orientated differently, divided into pixels p with the scanning lines represented at L). Thus, the spatial resolution is determined by the pixel size, which is in turn determined by the number of lines per field or frame of the video system employed.

Obviously, in general, when the pictures PA and PB are combined to form a composite picture, the edge B1 (p1-p2) at which the two pictures PA and PB intersect will not coincide precisely with pixel boundaries. Instead, in general, the edge will intersect pixels. Therefore, when the pictures PA and PB are combined together, a decision has to be made on the picture content of each pixel intersected by an edge. Thus, if, for example, the decision is to the effect that each such pixel will comprise either wholly one of the pictures PA and PB or wholly the other of the pictures depending upon whether the majority of that pixel should be occupied by the one picture or the other picture, respectively, the result is that the desired boundary between the pictures is in practice provided by a step-wise approximation thereto at pixel resolution. This can be more clearly appreciated by referring further to FIG. 7, in which the desired boundary (corresponding to the edge p1–p2) is shown by the line B1 and the step-wise approximation thereto by a line B2. Thus, the actual edge is jagged and there is aliasing between the pictures PA and PB. The degree of jaggedness becomes particularly noticeable when the edges are close to the horizontal or close to the vertical.

OBJECTS AND SUMMARY OF THE INVENTION

An object of the invention is to overcome at least partially the first of the above-mentioned disadvantages, namely the need to use a respective DME (DVE) generator for each input video signal.

Another object of the invention is to overcome at least partially the second of the above-mentioned disadvantages, namely that of degradation (jagged edges) of the composite image or picture where the edges of the individual images or pictures meet.

A further object of the invention is to overcome at least partially both the first and second disadvantages mentioned above.

The invention provides a method of generating an output video signal, the method comprising processing a plurality of input digital video signals so as to manipulate images that they represent and combining the processed signals to form said output video signal, which represents a composite image in which the manipulated images appear to fly through one another. The method is characterized in that:

in a first pass, a digital video effect generator is supplied with one of the input video signals and is responsive to data representing at least the manipulation to which the image represented by that one input signal is to be subjected to process that one input signal to subject the image represented thereby to the manipulation intended for that image;

the processed signal resulting from the first pass is recorded;

in at least one subsequent pass, the digital video effect generator is supplied with the other or another of the input video signals and is responsive to data representing the manipulations to which the images represented by all of the input signals are to be subjected to process that other input signal so as to subject the image represented thereby to the manipulation intended for that image and so as to remove from the manipulated image any one or more portions thereof to be hidden in the composite image; and the processed signal resulting from the at least one subsequent pass is keyed into the recorded signal resulting from the previous pass.

The method of the invention overcomes or at least alleviates the first of the above-mentioned disadvantages in that, by cropping out manipulated image portions as necessary to effect hidden surface removal, rather than using depth information to switch a combiner, the desired effect can be achieved using only one digital video effect generator, the method thus enabling the use of a single such generator and being carried out in successive passes or stages with recordal being effected between stages.

Preferably, at least the processed signal resulting from the at least one subsequent pass is subjected to anti-aliasing treatment to reduce aliasing where at least one edge of the image represented by the processed signal will intersect the image represented by the other or another of the processed signals in the composite image.

This feature overcomes or at least alleviates the second of the above-mentioned disadvantages in that jaggedness at the relevant edge is avoided or at least reduced.

Avoiding aliasing involves defining the relevant edges to greater accuracy, that is to a higher resolution than the sampling frequency. One way of doing this, employed in computer graphics, is to identify, by computation, each pixel crossed by an edge and to compute, for each pixel crossed by an edge, an appropriate value for the intensity of the pixel. It must be appreciated, however, that the edges may intersect with a very large number of pixels whereby the total time taken to perform the necessary computation for all of such pixels may be very long (in some cases in the order of hours), in fact so long that this approach is at least at present unfeasible for use in real time processing of video signals and therefore, at least at present, could not be used to achieve anti-aliasing in the present application.

One approach to solving the above problem that is sufficiently fast for use in real-time video processing involves the use of a two-dimensional digital low pass filter. By deriving a value for each pixel of the composite image by a weighted combination of surrounding pixels, the filter hides the aliasing by, in effect, removing the jaggedness, which represents high frequency picture content. This technique can therefore be used in the present application. However, using such a filter leads to the disadvantage that the appearance of the edges is "soft", i.e. the edges are not sharply defined. This may be considered subjectively undesirable.

Preferably, therefore, the anti-aliasing treatment comprises:

generating for each field, from said data representing the manipulations to which the images represented by all of the input signals are to be subjected, edge data defining the edges of a polygon forming at least a part of the image represented by the processed signal;

generating from the edge data, for each horizontal scanning line in which a row of pixels corresponding to that scanning line is intersected by edges of the polygon, information representing: the horizontal locations of first and second start pixels, namely those of the row of pixels in which first and second edges, respectively, of the polygon start to intersect that row; the gradients of the first and second edges; and a key value (the proportion of the image represented by the processed signal to be contained in a pixel of the composite image) for each of the first and second start pixels;

generating, in response to the above-mentioned information, for each horizontal scanning line, a key value for each successive one of the row of pixels corresponding thereto, by: ramping up the key value from zero, for pixels preceding the first start pixel, by incrementing the key value for the first start pixel, for pixels following the first start pixel, by an amount per pixel determined by the gradient of the first edge, until the key value reaches unity; and ramping down the key value from unity, by decrementing the key value for the second start pixel, for pixels following the second start pixel, by an amount per pixel determined by the gradient of the second edge, until the key value reaches zero; and using the generated key values to control keying of the processed signal into a background signal.

Such an anti-aliasing treatment avoids the need to use two-dimensional filtering to reduce the type of aliasing described above and therefore enables the achievement of hard (sharp) edges. The treatment also can be carried out in real time, that is at the speed of the video signals. In this regard, the generation of the necessary information from the edge data for each field has to be carried out only once for each scanning line and the totality of such information for all lines enables processing of all edge-intersecting pixels to be carried out. Furthermore, instead of carrying out a separate and individual calculation for each edge-intersecting pixel in a line, which would be prohibitively slow in some cases in view of the fact that an edge very close to the horizontal could intersect several hundred pixels in a conventional video system and more than a thousand pixels in a high definition television (HDTV) system (a 1125 line system), the method need establish, for each line, only the start pixel location, start pixel key value and gradient for each edge, these being used to increment or decrement each start key value by an amount determined by the gradient whereby each edge-intersecting pixel in the row of pixels corresponding to the line can be processed in real time.

BRIEF DESCRIPTION OF THE DRAWINGS

The above and other objects, features and advantages of the invention will be apparent from the Following detailed description of illustrative embodiments thereof, which is to be read in conjunction with the accompanying drawings, in which like references indicate like items throughout, and in which.

DESCRIPTION OF THE PREFERRED EMBODIMENTS

Figure 8:
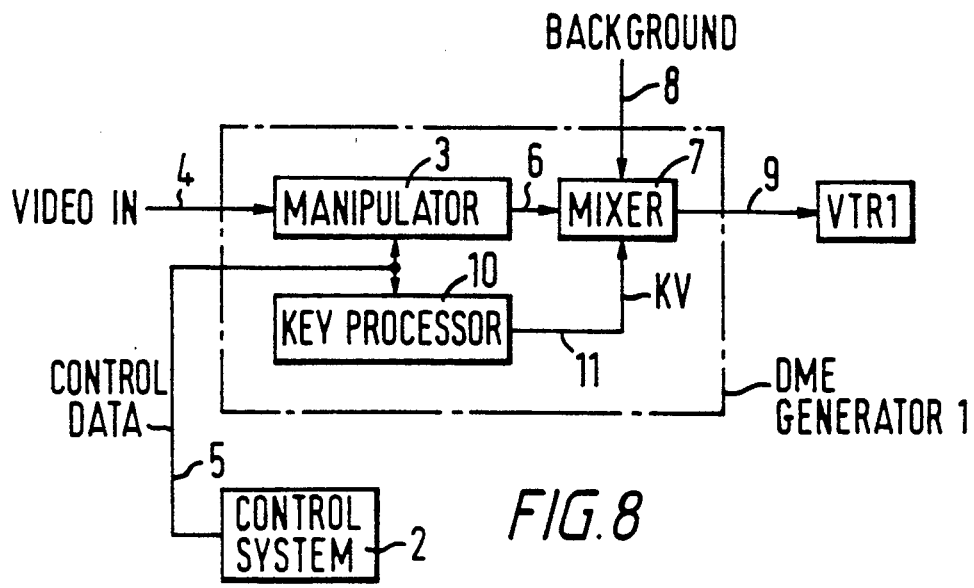
FIG. 8 is a schematic block diagram of an apparatus for carrying out a method embodying the invention for creating the effect described with reference to FIGS. 1 through 4.

FIG. 8 is a schematic block diagram of an apparatus for carrying out a method embodying the invention for creating the digital video effect described above with reference to FIGS. 1 through 4. The apparatus comprises a DME (DVE) generator 1 and a control system 2 therefor. The DME generator 1 includes a manipulator 3 which, in a manner known per se, processes a digital video signal supplied thereto via a bus 4, in accordance with control (manipulation) data supplied thereto on a bus 5 from the control system 2, to produce a processed video signal on a bus 6, the processing comprising sample by sample (pixel by pixel) mapping of the digital video signal such that the image or picture represented thereby is manipulated (cropped, reduced in size, rotated, sheared etc.) on a field by field basis in a manner determined by the control data.

The control data uniquely identifies the manipulation of the picture on a field by field basis in accordance with a path of movement of the picture with respect to the screen as selected by means of the control system 2. The control data may, for example, comprise a set of Cartesian coordinates identifying the positions of the corners of the picture in a three-dimensional input space, a 4×4 matrix defining the manipulation to be effected for all points in the picture for the current field, to transform it into a three-dimensional output space, and a parameter referred to as perspective that indicates the spacing of the viewer from the screen in terms of a distance along a Z axis of the coordinate system employed, the X and Y coordinates indicating spacing along axes parallel to a screen on which the manipulated picture is displayed.

The bus 6 is connected to a mixer 7. Also connected to the mixer 7 is a bus 8 supplying a neutral (for example, plain blue or black) background signal. Accordingly, a composite picture comprising the manipulated digital video signal on the bus 6, keyed into the neutral background signal on the bus 8, is developed on a bus 9 connected to an output of the mixer 7, on a pixel by pixel basis for each field.

The DME generator 1 and control system 2 as so far described are of conventional construction. Further features incorporated in the DME generator 1 to enable it to carry out a method embodying the invention will now be described.

In carrying out the method embodying the invention, respective different video signals which are to be subjected to processing involving respective different manipulations of the pictures which they represent, and then combined to produce an output video signal representing a composite picture in which the manipulated images appear to fly through one another, are processed in turn (in sequential passes or stages) by the DME generator 1 and combined after having been recorded between the passes. At least in those passes subsequent to the first, the processing of the signal involves not only manipulation of the picture by the manipulator 3 as described above, but also effecting hidden surface removal by cropping from the manipulated picture any portion or portions thereof which are to be hidden (as described above with reference to FIGS. 1 through 4 and 6) in the composite picture. A key processor 10 accomplishes the hidden surface removal, which is readily possible since, knowing the locations of the various pictures, it is of course only a matter of simple geometry. To enable the key processor 10 to do this, instead of the control data being supplied to the DME generator 1 on a pass by pass basis, the control data for all of the passes is supplied to the DME generator for each of the passes so that, for each field of each pass (except perhaps for the first), the key processor 10 can calculate whether hidden surface removal is needed and, if so, cause it to be carried out by supplying appropriate information to the mixer 7.

More specifically, the key processor 10 receives the control data on the bus 5 from the control system 2 and uses that data to calculate a key value signal KV which it supplies to the mixer 7 via a line 11 to control the keying of the manipulated video signal on the bus 6 into the background signal on the bus 8. The key value signal KV, which is developed on a pixel by pixel basis for each field of each pass, not only causes the above-described cropping (hidden surface removal) to be carried out, if appropriate, but also effects, in a manner described more fully below, an anti-alias treatment to reduce aliasing (jaggedness) at the edges of the manipulated (and possibly cropped) picture represented by the processed signal, and particularly at edges where the picture intersects the picture or pictures represented by the other processed signal or signals.

Figure 9:
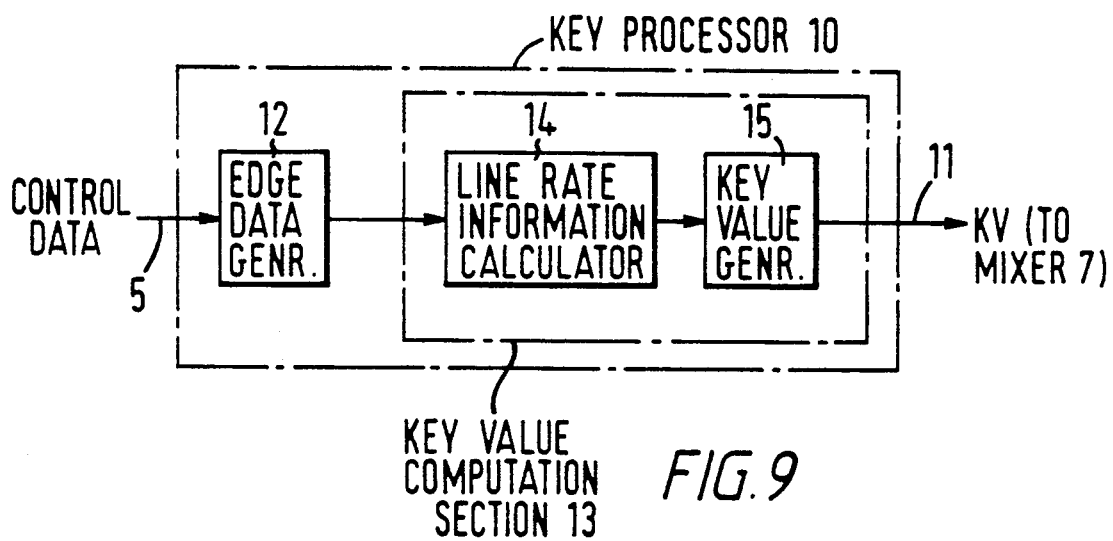
FIG. 9 is a view in more detail of a key processor of the apparatus of FIG. 8.

As shown in FIG. 9, the key processor 10 comprises an edge data generator 12. The edge generator 12, which may be microprocessor based, computes, from the control data, edge data which identifies the edges of the manipulated (and possibly cropped) picture for the current pass on a field by field basis. The edge data may for example be in the form of a list of numbers defining the edges, or, as described more fully below, may be in the form of equations defining the edges.

The key processor 10 further comprises a key value computation section 13 which calculates the key value signal KV from the edge data calculated by the edge data generator 12. The key value computation section 13 comprises a line rate information calculator 14 and a key value generator 15. One form of implementing the key processor 10 is described in more detail below with reference to FIGS. 13 through 21.

The way in which the DME generator 1 can be used to carry out a method embodying the invention will now be described with reference to FIGS. 6 through 12.

Figure 11:
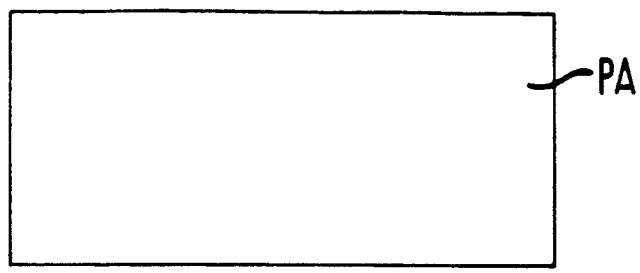
FIGS. 11 and 12 show, respectively, the two pictures making up the composite picture of FIG. 6.

As a first example of the operation of the DME generator 1, suppose that the effect described above with reference to FIG. 6 is to be created. In the first pass, the video signal applied to the DME generator 1 via the bus 4 is that representing the unmanipulated picture PA, as a result of which the manipulator 3 produces, on the bus 6, a manipulated signal representing the picture PA, as shown in FIG. 11.

The manipulated signal representing the picture PA is keyed into the background signal on the bus 8, in the mixer 7, the keying being effected under the control of the key value KV generated by the key processor 10 whereby, as described above, anti-aliasing treatment is carried out to minimize jaggedness of the edges. It will be noted that, in the case of this first pass, no cropping (hidden surface removal) of the image is effected.

The resultant signal outputted by the mixer 7 is supplied directly via the bus 9 to a video tape recorder (VTR) VTR1 and recorded thereby on tape.

In the second pass, the video signal applied to the DME generator 1 via the bus 4 is that representing the unmanipulated picture PB, as a result of which the manipulator 3 produces, on the bus 6, a signal representing the whole of the manipulated picture PB.

Figure 6:
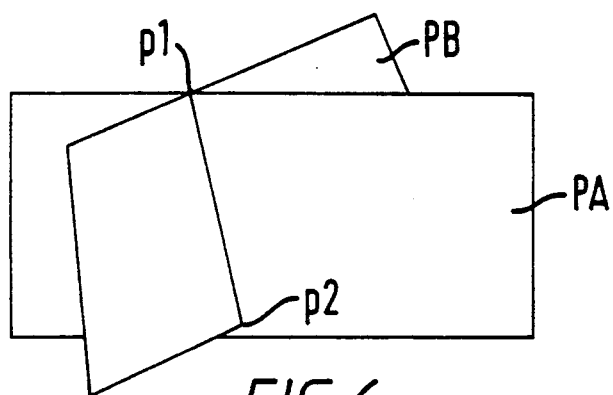
FIG. 6 is a view similar to FIG. 1, but for a simpler case in which the effect comprises two pictures only.
Figure 7:
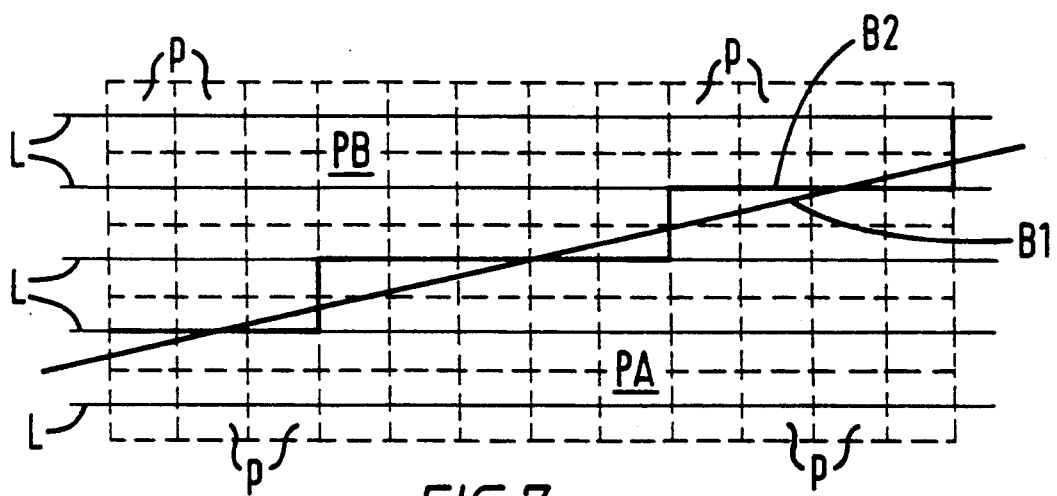
FIG. 7 shows, on an enlarged scale, a part of a composite picture like that of FIG. 6 where the two pictures intersect, but with the edge where the intersection takes place orientated differently than in FIG. 6.
Figure 12:
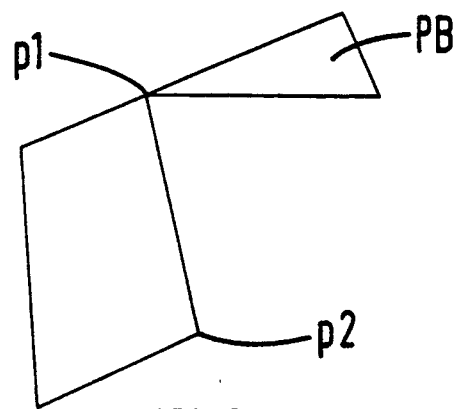

As during the first pass, the signal representing the manipulated picture PB as produced during the second pass is keyed into the background signal on the bus 8, in the mixer 7, the keying being effected under the control of the key value signal KV generated by the key processor 10 whereby (i) that part of the manipulated picture PB which (as shown in FIG. 6) is hidden in the composite picture by the picture PA is cropped out so that the processed signal produced on the bus 9 represents a manipulated and cropped image as shown in FIG. 12; and (ii) the above-mentioned anti-aliasing treatment is carried out to minimize jaggedness of the edges.

Figure 10:
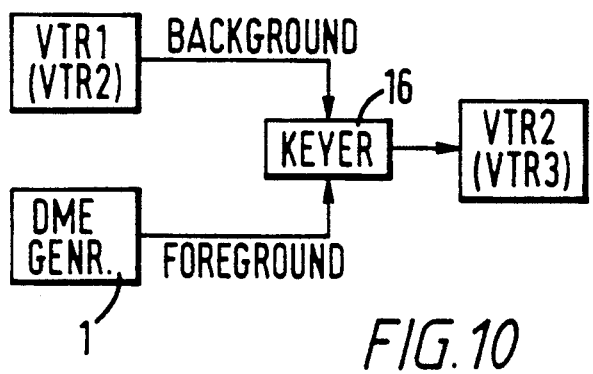
FIG. 10 shows how plural processed video signals produced in successive passes by the apparatus of FIG. 8 can be combined to form an output video signal embodying the effect described with reference to FIGS. 1 through 4.

During the second pass, the resultant signal outputted by the mixer 7 via the bus 9 is not supplied directly to a VTR. Instead, as shown in FIG. 10, it is supplied as a foreground signal to a first input of a keyer 16. Simultaneously, the signal recorded on the VTR VTR1 during the first pass is supplied as a background signal to a second input of the keyer 16, the two signals being supplied to the keyer in synchronism. The resultant output signal, which represents the composite picture as shown in FIG. 6, is outputted by the keyer 16 and recorded on a VTR VTR2. The desired effect has thus been created.

As a second example of the operation of the DME generator 1, suppose that the effect described above with reference to FIGS. 1 through 4 is to be created. In the first pass, the video signal applied to the DME generator 1 via the bus 4 is that representing any one of the unmanipulated pictures P1 to P3, say for example the picture P1. As a result of this, the manipulator 3 produces, on the bus 6, a signal representing the whole of the manipulated picture P1.

Figure 1:
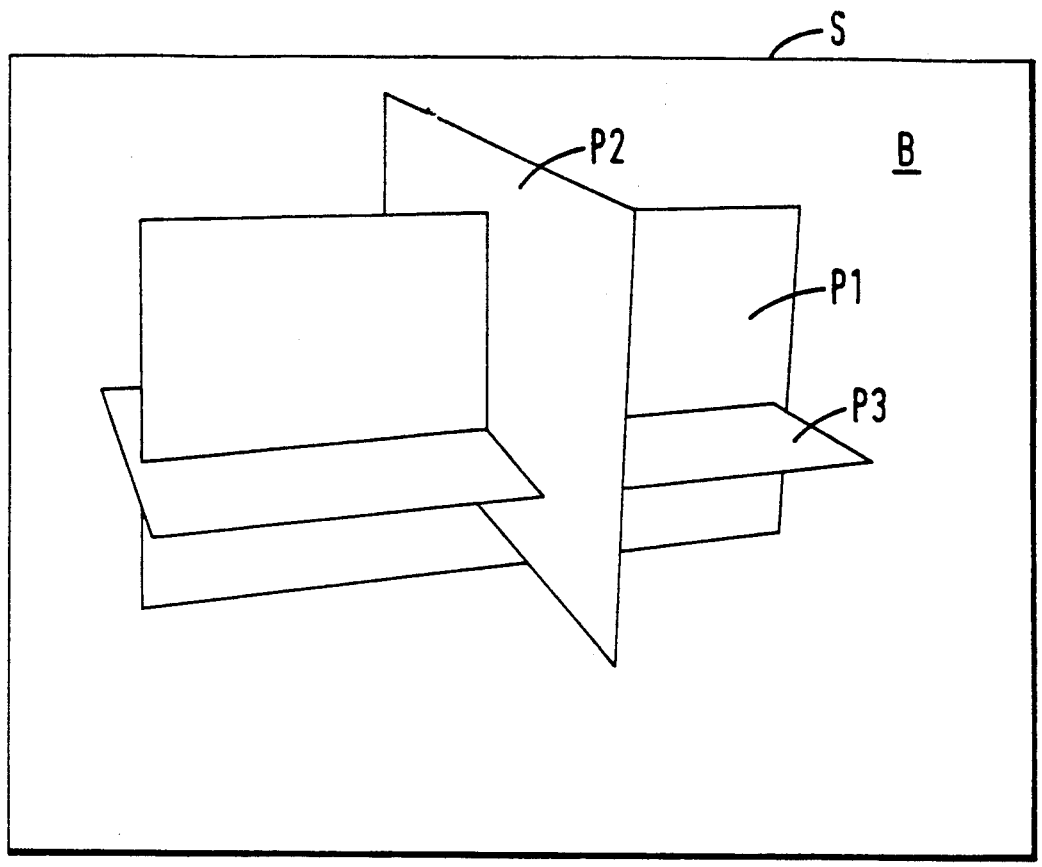
FIG. 1 represents the display on a screen of a composite picture represented by a video signal embodying a digital video effect in which three pictures appear to fly through one another, the figure showing an instant in time during the effect in which all the three pictures intersect one another.
Figure 2:
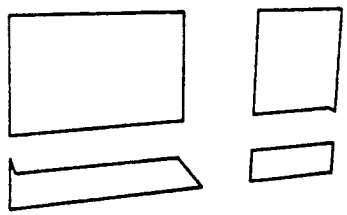
FIGS. 2 to 4 show, on a reduced scale, those parts of the three pictures that are displayed at that instant.

The signal representing the manipulated picture P1 is keyed into the background signal on the bus 8, in the mixer 7, the keying being effected under the control of the key value signal KV generated by the key processor 10 whereby: (i) those parts of the picture P1 which (as shown in FIGS. 1 and 2) are hidden in the composite picture by the pictures P2 and P3 are cropped out so that the processed signal produced on the bus 9 represents a manipulated and cropped image as shown in FIG. 2; and (ii) the above-mentioned anti-aliasing treatment is carried out to minimize jaggedness of the edges.

The resultant signal outputted by the mixer V is supplied directly via the bus 9 to a video tape recorder (VTR) VTR1 and recorded thereby on tape.

In the second pass, the video signal applied to the DME generator 1 via the bus 4 is that representing (say) the unmanipulated picture P2, as a result of which the manipulator 3 produces, on the bus 6, a signal representing the whole of the manipulated picture P2.

Figure 3:
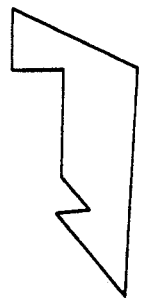

As during the first pass, the signal representing the manipulated picture P2 as produced during the second pass is keyed into the background signal on the bus 8, in the mixer V, the keying being effected under the control of the key value signal KV generated by the key processor 10 whereby: (i) those parts of the picture P2 which (as shown in FIGS. 1 and 3) are hidden in the composite picture by the pictures P1 and P3 are cropped out so that the processed signal produced on the bus 9 represents a manipulated and cropped image as shown in FIG. 3; and (ii) the above-mentioned antialiasing treatment is carried out to minimize jaggedness of the edges.

During the second pass, the resultant signal outputted by the mixer 7 via the bus 15 is not supplied directly to a VTR. Instead, as shown in FIG. 10, it is supplied as a foreground signal to the first input of the keyer 16. Simultaneously, the signal recorded on the VTR VTR1 during the first pass is supplied as a background signal to the second input of the keyer 16, the two signals being supplied to the keyer in synchronism. The resultant output signal, which represents the pictures P 1 and P2 ( but not the picture P3) of the composite picture as shown in FIG. 1, is outputted by the keyer 16 and recorded on a VTR VTR2.

In the third pass, the video signal applied to the DME generator 1 via the bus 4 is that representing the remaining one of the unmanipulated pictures P1 to P3, namely the unmanipulated picture PB, as a result of which the manipulator 3 produces, on the bus 6, a signal representing the whole of the manipulated picture P3.

Figure 4:
Figure 5:
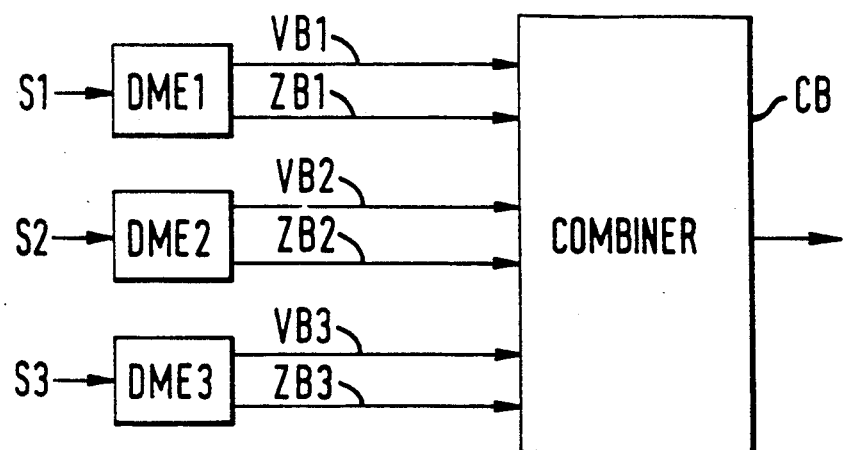
FIG. 5 is a schematic block diagram of an apparatus for carrying out a known method of creating the effect described with reference to FIGS. 1 through 4.

As during the first and second passes, the signal representing the manipulated picture P3 as produced during the third pass is keyed into the background signal on the bus 8, in the mixer 7, the keying being effected under the control of the key value signal KV generated by the key processor 10 whereby: (1) those parts of the picture P3 which (as shown in FIGS. 1 through 4) are hidden in the composite picture by the pictures P1 and P2 are cropped out so that the processed signal produced on the bus 9 represents a manipulated and cropped image as shown in FIG. 4; and (ii) the above-mentioned antialiasing treatment is carried out to minimize jaggedness of the edges.

During the third pass, the resultant signal outputted by the mixer 7 via the bus 9 is not supplied directly to a VTR. Instead, as shown in FIG. 10, it is supplied as a foreground signal to the first input of the keyer 16. Simultaneously, the signal recorded on the VTR VTR2 during the second pass is supplied as a background signal to a second input of the keyer 16, the two signals being supplied to the keyer in synchronism. The resultant output signal, which represents the pictures P1, P2 and P3 making up the composite picture as shown in FIG. 1, is outputted by the keyer and recorded on a VTR VTR3. The desired effect has thus been created.

As indicated above, one way in which the key processor 10 (FIG. 9) of the DME generator I of FIG. 8 can be constructed will now be described in detail with reference to FIGS. 13 through 20. Reference is also directed to our UK Patent Application Publication No GB-A-2 230 399, which discloses and claims a key processor as disclosed below.

Figure 13:
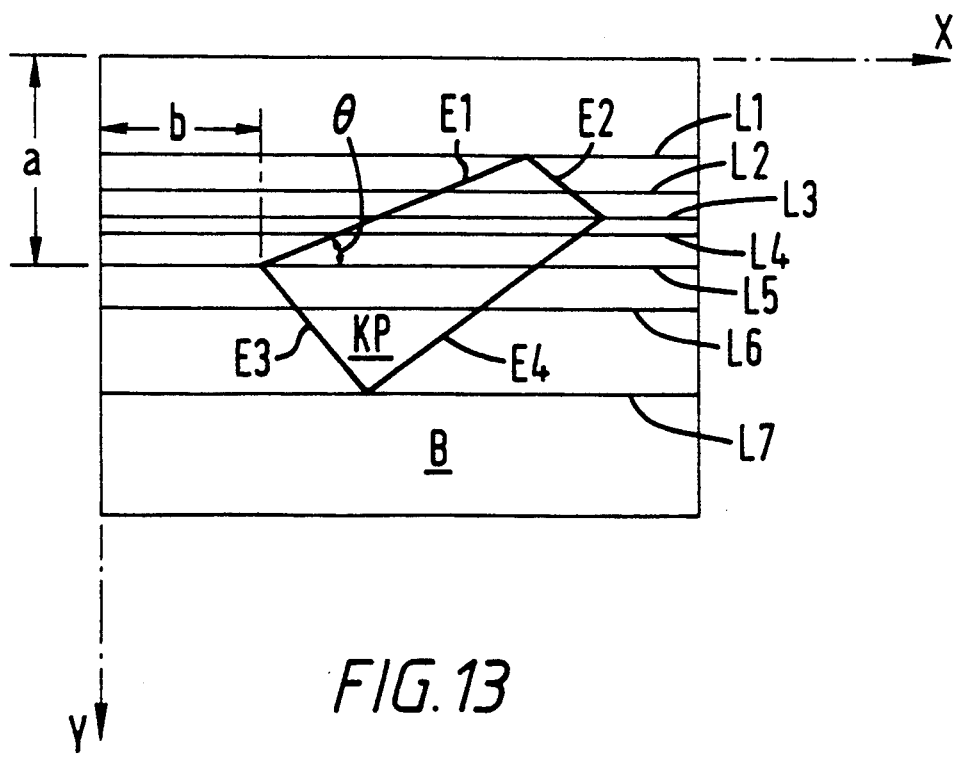
FIG. 13 shows a key picture inset into a background picture to form a combined picture.
Figure 14:
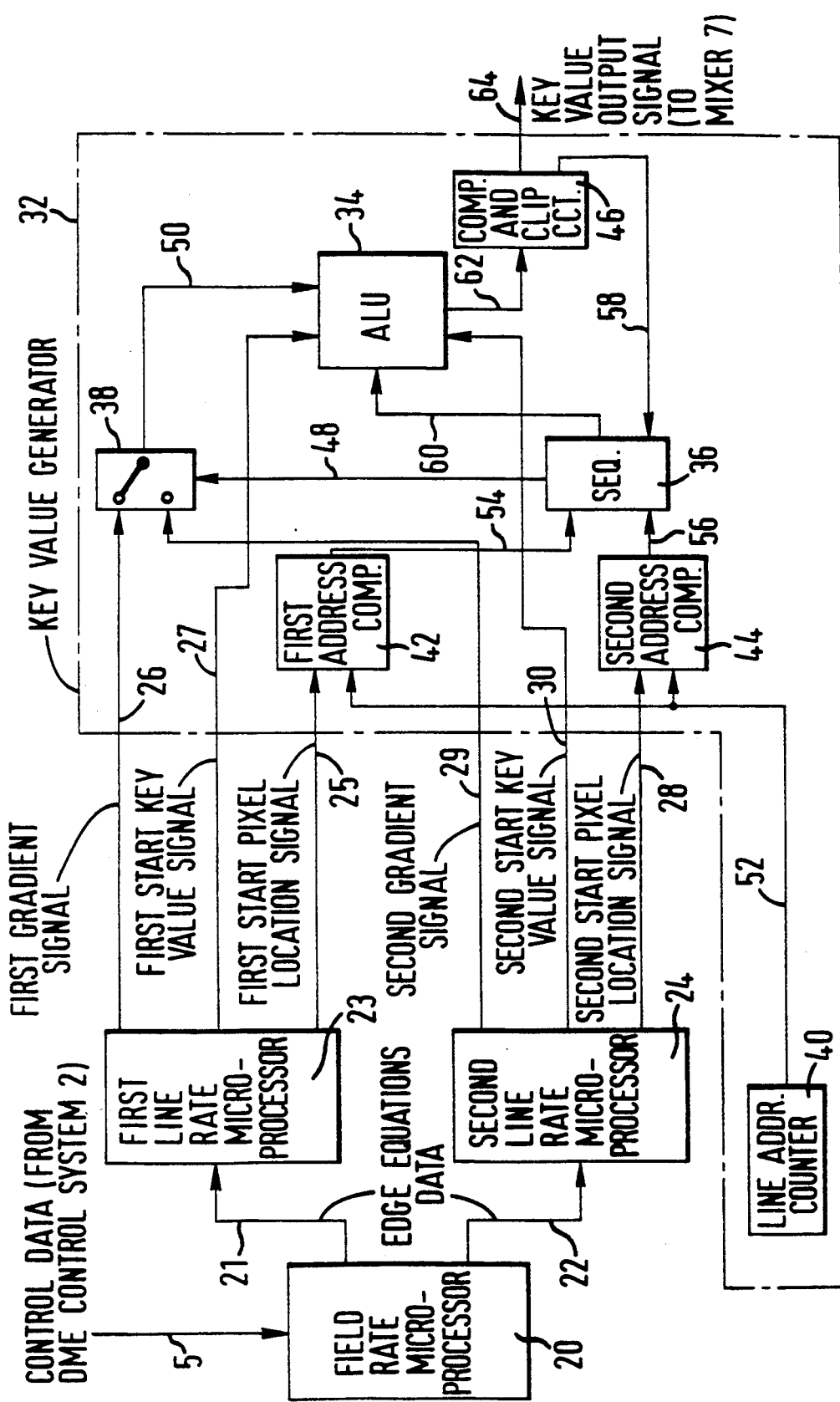
FIG. 14 shows, in block schematic form, one way of implementing the key processor, which controls the combining (mixing) of video signals representing the key and background pictures on a pixel by pixel basis to form a video signal representing the combined picture.

A key processor representing generally one way in which the key processor 10 of FIG. 9 may be implemented is shown in FIG. 14. The key processor of FIG. 14 controls the combining by the mixer 7 of FIG. 8 of first and second video signals, namely those on the busses 6 and 8, respectively, which represent first and second pictures or images, respectively, to produce a video signal (that on the bus 9) representing a combined picture. The first picture (that represented by the signal on the bus 6) is referred to hereinafter as a key picture KP and, as shown in FIG. 13, it is inset into the second picture (that represented by the signal on the bus 8), which is referred to hereinafter as a background picture B, to produce a combined picture as shown in FIG. 13.

The key processor of FIG. 14 produces, for each pixel of the combined picture, a key value (the nature and derivation of which are explained more fully below) that indicates the proportions in which the key and background pictures KP and B are to be mixed to derive a pixel of the combined picture. In other words, the key processor produces a mixing ratio signal for the mixer 7 on a pixel by pixel basis. The key value can vary from zero (indicating that the relevant pixel of the combined picture comprises only the background picture B) to unity (indicating that the relevant pixel of the combined picture comprises only the key picture KP), these values being represented, for example, by eight bits representing a range of numbers from 0 to 255.

It will be assumed for the sake of illustration that the key picture KP is four-sided in that it comprises a manipulated version of the whole or a rectangular part of a rectangular picture whose manipulation may comprise rotation of the rectangle about one or more of three axes (and, if desired, translation along one or more of such axes ) whereby, although based on a rectangle, the key picture ( as developed onto the plane of the combined picture, that is as seen on the screen) will in many cases have some or all of its four straight edges (E1 to E4 in FIG. 13) meeting at angles other than right angles. FIG. 13 shows one example of such manipulation, in which the basic key picture rectangle has been rotated to some extent above three axes. The above-described apparatus including the key processor stores, in a manner known per se, successive fields of the key picture KP in one or more field stores (in the manipulator 3) which corresponds in pixel structure to a standard field. In other words, in the case of the particular field represented in FIG. 13 (bearing in mind that the key picture may be manipulated continuously so that the outline thereof may change from field to field), the field store contains no information for the pixels outside of the area of the key picture, and in fact contains information (namely that representing the key picture) only for the pixels included within the edges E1 to E4 of the key picture. Thus, when a field of key picture information from a key picture field store is fed to the mixer 7 together with a field of the background picture B, the two fields being synchronized so that corresponding pixels are processed together in the mixer 7, the two fields are combined to produce a field of the composite picture as shown in FIG. 13. Naturally, this requires that the key value (mixing ratio) will be zero (corresponding to zero key picture KP and 100% background picture B) for the pixels located wholly outside of the key picture KP, and unity (corresponding to 100% key picture KP and zero background picture B) for the pixels locally wholly within the key picture. For those pixels intersecting the edges E1 to E4 of the key picture KP, the key values are set by the key processor of FIG. 14 at values between zero and unity, as described in detail below, in order to at least reduce the above-described jagged edge/aliasing phenomenon.

The apparatus shown in FIG. 14 comprises a field rate microprocessor 20, the term "field rate" meaning that the microprocessor 20 has to carry out the operation described below only once per field. For each field, the field rate microprocessor 20, which corresponds to the edge data generator 12 of FIG. 9, is supplied by the DME control system 2 with the control data via the bus 5. As explained above, the control data identifies the locations of the four corners of the key picture KP in an X-Y orthogonal coordinate system (the axes of which are the horizontal and vertical directions of the picture, for example as represented in FIG. 13) and is not restricted to pixel locations, being in floating point form and therefore, for practical purposes, representing the X and Y positions of each corner in an infinitely variable form.

For each field, the microprocessor 20 is operative to translate the key picture orientation information into information (for example four equations) defining the respective edges E1 to E4 of the key picture. This is a matter of simple trigonometry. For example, the edge E1 in FIG. 13 is defined by the equation $$y = a - (x - b) \tan \theta,$$

where a and b are the coordinates of the corner of the key picture where the edges E1 and R3 meet and $\tan \theta$ is the gradient of the edge (which can readily be computed by subtracting the coordinates of the corners at the opposite ends of the edge E1). At or prior to the start of each field, data defining the equations (and therefore defining the edges E1 to E4) for that field) is supplied via lines 21 and 22 to a first line rate microprocessor 23 and to a second line rate microprocessor 24. (If the data is transferred in parallel, the lines 21 and 22 will in fact be multi-bit busses. The same may apply to other connections in FIG. 15 referred to hereinafter as lines). The term "line rate", as applied to the microprocessors 23 and 24, means that the microprocessors have to perform the operations described below for each line of each field. The microprocessors 23 and 24 correspond to the line rate information calculator 14 of FIG. 9.

Referring back to FIG. 13, it will be seen that: horizontal scanning lines of the combined picture preceding (i.e. above) a line L1 do not intersect the edges E1 to E4 of the key picture KP; all those lines between the line L1 and a line L2, for example a line L2, first intersect the edge E1 and then intersect the edge E2; all those lines between the line L3 and a line L5, for example a line L4, first intersect the edge E1 and then intersect the edge E4; all those lines between the line L5 and line L7, for example a line L6, first intersect the edge E3 and then intersect the edge E4; and all lines subsequent to (i.e. below) the line L7 do not intersect the edges. That is to say, each scanning line either intersects none of the edges E1 to E4 or two of the edges E1 to E4. While the foregoing analysis is specific to the particular orientation of the key picture KP shown in FIG. 1B, it should be appreciated that the same proposition holds true in general. That is to say, regardless of how the key picture KP is manipulated, those scanning lines between the top and bottom of the key picture will always intersect two edges of the key picture. Moreover, knowing the data defining the edges for any one field, it is a matter of simplicity to ascertain, for each scanning line, whether it intersects the edges of the key picture and, if it does, which two edges it intersects and where it intercepts them. As will now be described in more detail, the line rate microprocessors 23 and 24 take advantage of this phenomenon. Thus, for each scanning line of a field, the line rate microprocessors 23 and 24 process the edge equations data supplied thereto for that field to determine whether the row of pixels corresponding to that line is intersected by edges of the key picture. If they determine that such edge intersections will take place, the first line rate microprocessor 23 outputs information relating to the first of the two edge intersections and the second line rate microprocessor 24 outputs information relating to the second of the two edge intersections. Specifically, the first line rate microprocessor 23 outputs: on a line 25, a first start pixel location signal identifying the horizontal location of a first start pixel, namely that one of the row of pixels in which a first edge of the key picture KP starts to intersect that row; on a line 26, a first gradient signal representing the gradient of the first edge; and, on a line 27, a first start key value signal that represents the key value of the first start pixel. Similarly, the second line rate microprocessor 24 outputs: on a line 28, a second start pixel location signal identifying the horizontal location of a second start pixel, namely that one of the row of pixels in which a second edge of the key picture KP starts to intersect that row; on a line 29, a second gradient signal representing the gradient of the second edge; and, on a line 30, a second start key value signal that represents the key value of the second start pixel. The above signals produced, for each scanning line, by the line rate microprocessors 23 and 24, are applied to a key value generator 32 (corresponding to the key value generator 15 of FIG. 9) that uses the signals to produce a key value for every one of the pixels of the row, the key values being supplied to the mixer 7, as explained above, to control combination or mixing of the video signals representing the background picture B and the key picture KP. It should be noted that the foregoing signals may be produced by the line rate microprocessors 23 and 24 for all of the scanning lines, though in the case of scanning lines in which no edge intersections take place the values of the signals are such as effectively to indicate to the key value generator 32 that there are no intersections. Specifically, the values of the first and second start pixel locations for the lines can be set to values indicating imaginary or invalid pixel locations that are beyond the right hand edge of the background picture, i.e. "off-screen" pixel locations.

The key value generator 32 comprises an arithmetic and logic unit (ALU) 34 and, controlling the operation of the ALU, control means constituted by a sequencer 36, a switch 38, a line address counter 40, first and second address comparators 42 and 44 and a comparator and clip circuit 46.

The lines 26 and 29 carrying the first and second gradient signals are connected to respective inputs of the switch 38 whereby, under the control of the sequencer 36 via a line 48, the switch 38 can apply either of the first and second gradient signals (via a line 50) to the ALU 34 at any one time. The lines 27 and 50 carrying the first and second start key value signals are connected directly to the ALU 34. The lines 25 and 28 carrying the first and second start pixel location signals are connected to first inputs of the first and second address comparators 42 and 44, respectively. Second inputs of the first and second address comparators 42 and 44 are connected by a line 52 to receive an output signal from the line address counter 40. Lines 54 and 56 connect outputs of the first and second address comparators 42 and 44, respectively, to respective inputs of the sequencer 36. Another input of the sequencer 36 is connected via a line 58 to receive a signal fed back from the comparator and clip circuit 46. An output of the sequencer 36 controls the operation of the ALU 34, as described below, via a control line 60. For each pixel of each line of a field, the ALU 34 outputs a key value on a line 62. Each key value on the line 62 is fed via the comparator and clip circuit 46 (in which, as described below, it is compared with reference values and (optionally) clipped) to a line 64 (corresponding to the line 11 in FIG. 8) that supplies the key values to the mixer 7.

The key processor of FIG. 14 operates in the following manner for a field having the particular key picture KP shown in FIG. 13 (and in an analogous manner in fields containing different key pictures). As explained above, the edge equations data defining the current edges E1 to E4 of the key picture KP is input ted by the field rate microprocessor 20 to the first and second line rate microprocessors 23 and 24 at or prior to the start of the field. Prior to the start of the first line of the field, the microprocessors 23 and 24 process the edge equations data to produce, for that line, values for the first and second gradient signals, first and second key value signals and first and second start pixel location signals. The values of those signals (more specifically the values of the first and second start pixel location signals) indicate, as explained above, whether the row of pixels corresponding to that line is intersected by edges of the key picture. In the case of FIG. 13, no such intersections occur for the first line. Therefore, during that line, the values of the gradient, start key value and pixel start location signals outputted by the line rate microprocessors 2B and 24 on their output lines 25, 26, 27, 28, 29 and 30 (more specifically the values of the start pixel location signals on the lines 25 and 28) are such as to indicate that no intersections occur and the sequencer 36 causes the ALU 34 to remain, throughout that line, in a static state in which it perform an operation according to which, for each pixel, the ALU applies to the line 62 a key value of zero which is applied via the comparator and clip circuit 46 to the line 64 and passed to the mixer 7 whereby, for all of that line, the composite picture comprises the background picture only. For each pixel, the key value applied to the line 62 by the ALU 34 is compared in the comparator and clip circuit 46 with a reference value of unity and a reference value of zero, and the result of the comparison (key value = unity or key value = zero) is fed back to the sequencer 36 via the line 58. Thus, for each pixel of the first line, the signal fed back to the sequencer 36 via the line 58 indicates that the key value is zero. This has the effect of causing the sequencer 36 to keep the ALU 34 in the above-mentioned static state.

The above process is repeated for all the lines down to the line L1 in FIG. 13, the ALU 34 remaining in the static state in which it applies a stream of key values each of value zero to the line 64 extending to the mixer 7. When, however, the current scanning line starts to intersect the edges of the key picture KP, the ALU 34 starts to perform arithmetical operations to generate different key values for different pixels.

Figure 15:
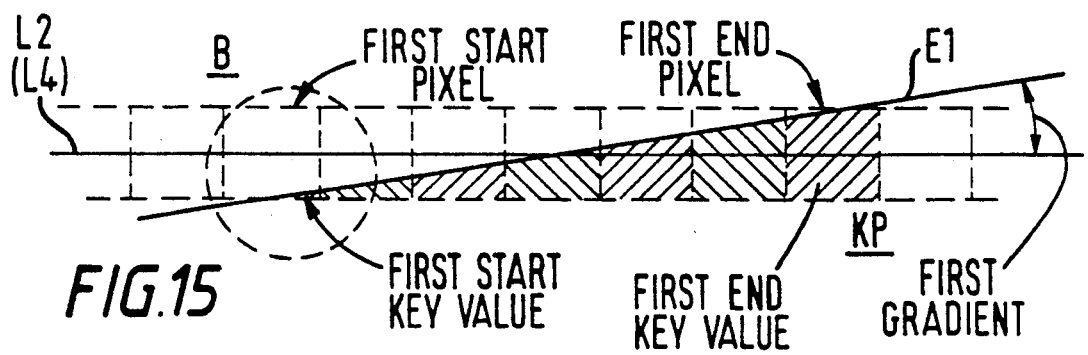
FIG. 15 shows the intersection of a first edge of the key picture with a row of pixels corresponding to a horizontal scanning line of the combined picture.
Figure 16:
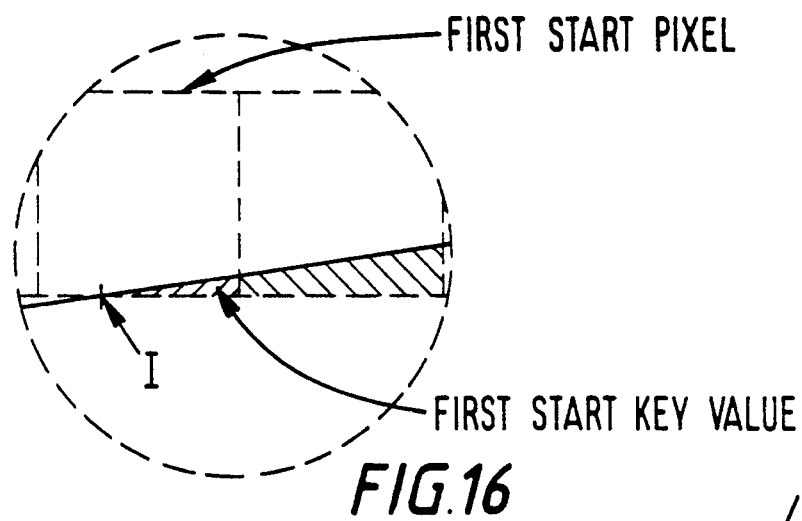
FIG. 16 is an enlarged view of a portion of FIG. 15 enclosed within a dotted-line circle in FIG. 15.
Figure 17:
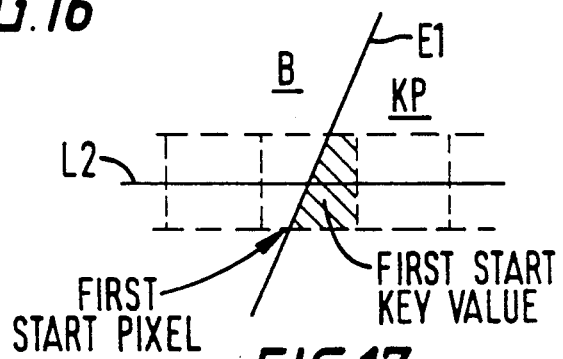
FIG. 17 is a view corresponding to FIG. 15, but showing a case in which the first edge is inclined less closely to the horizontal than in FIG. 15.

Consider first the scanning line L2, in which the corresponding row of pixels is intersected by the edge E1 (as shown in FIGS. 15 and 16) and, later on, by the edge E2 (as shown in FIG. 17). During the preceding scanning line, the line rate microprocessors 23 and 24 have calculated values for the first and second gradient signals, first and second start pixel location signals and first and second start key value signals for the line L2. (Since intersections will take place in the line L2, the values of the first and second start pixel location signals signify or represent real or "on-screen" pixel locations). These signals are outputted by the microprocessors 2B and 24 at or just prior to the start of the line. At or prior to the start of the line, the switch, B8 is put by the sequencer 36 into the condition illustrated in FIG. 14 whereby the first gradient signal is applied to the ALU 34 via the line 50. Also, both the first and second start key value signals are applied (via the lines 27 and 30) to the ALU 34 so that the key values they represent are ready to be loaded therein.

The line address counter 40 outputs a signal representing the addresses of successive pixels along the line 42. That is, the signal produced by the counter 40 indicates the current pixel position along the current line, in the present case the line L2. That signal is compared in the first address comparator 42 with the address or location of the first start pixel, that is the first pixel in which the edge E1 of the key picture intersects the row of pixels corresponding to the line L2. Prior to the comparator 42 detecting that the current pixel is the first start pixel, the sequencer 36 causes the ALU 34 to be in the above-described static state in which it outputs a key value of zero for each pixel. When the comparator 42 detects that the current pixel is the first start pixel, it produces a signal on the line 54 and the sequencer 36 is responsive thereto to cause the ALU 34, via the control line 60, to go into another state. The ALU 34 loads the first key value represented by the first start key value signal and, for the current pixel (the first start pixel), outputs a key value equal to that represented by the first start key value signal. Then, for each successive pixel, the ALU 34 ramps up the key value by incrementing it by a predetermined amount per pixel whose magnitude is determined by the magnitude of the gradient of the edge E1 as indicated by the first gradient signal. Each such successive pixel key value outputted by the ALU 34 on the line 62 is passed via the comparator and clip circuit 46 to the line 64 and thence to the mixer 7 whereby the key value for the successive pixels is incremented towards unity as the location of the current pixel, intersecting the edge El, goes further towards the key picture, whereby jaggedness/aliasing of the composite picture at the edge E1 is subjectively substantially wholly suppressed and a hard edge is obtained. Each such successive pixel key value is compared in the comparator and clip circuit 46 with the above-mentioned zero and unity reference key values. When that comparison operation indicates that the key value has ramped up (i.e. been incremented) to unity by the ALU 34, signifying that the key value generator 32 believes that the current pixel is located wholly within the key picture KP whereby the intersection of the edge E1 has been completed and no further incrementation of the key value is needed, the signal representative thereof on the line 58 causes the sequencer 36 to control the ALU 34 (via the line 60) to put it back into its static state in which it provides a fixed key value output for succeeding pixels and performs no arithmetical operations, though in the present case that fixed value is unity since the pixels in question are within the key picture KP. The sequencer 36 is also responsive to the signal on the line 58 to change over the switch The above-described key value ramping up or incrementation process can be understood more fully by referring to FIGS. 15 and FIG. 16 shows a region of the row of pixels corresponding to the line L2 which includes those pixels intersected by the edge E1 of the key picture. It was explained above that the signal produced on the line 25 by the line rate microprocessor 23 indicates the location or address (i.e. the position along the line L2) of the first start pixel, that is the pixel in which the edge E1 starts to intersect the row of pixels corresponding to the line L2. Calculation of the start pixel location clearly is a matter of elementary geometry based on the equation for the edge E1 since it involves only calculation of the horizontal coordinate point represented at I in FIG. 16 where the edge L1 intersects the line defining the lower boundary of the row of pixels, which is located half of a pixel height below the current scanning line. (Clearly, knowledge of the horizontal coordinate of the point I indicates that pixel along the row in which it is located). It was also explained above that the signal produced on the line 27 by the line rate microprocessor 23 represents the key value of the first start pixel. How the key value of the first start pixel is calculated will now be explained in more detail.

As indicated above, the key value represents the proportion of the first picture to be contained in a pixel of the combined picture. As will be appreciated, the key value for any pixel thus can be considered to be the area of that pixel (relative to its whole area), or the proportion of the whole area of the pixel, that falls inside of the key picture. Thus, for each of those seven (for example) pixels in FIG. 15 that are intersected by the edge El, namely for the first start pixel and the six following pixels, the key value is the shaded area divided by the whole area. (The key value for the previous pixels is, of course, zero, and that for the following pixels is unity).

Clearly, knowing the locations of the pixels and the location of the edge E1, it would be a matter of mathematical simplicity to identify all of the pixels intersected by the edge E1 and to calculate precisely a key value for each of them. However, while these operations of identifying all of the pixels and calculating their key areas are simple, they are also very time-consuming. In this regard, it has to be borne in mind that a key picture edge inclined so as to be very near to the horizontal may intersect up to several hundred pixels in a conventional (525 or 625 line) video system and up to a figure approaching two thousand pixels in an HDTV (1125 line system); and that this figure might have to be doubled if both key picture edges crossing the line are close to the horizontal. It is technically unfeasible, at least with current technology, to perform all such calculations within one video signal line period. To avoid this difficulty, the present key processor does not identify all the pixels crossed by the edge E1 and does not, at least directly, individually calculate a key value for each of them. Rather, it performs these operations in an indirect manner (explained below) that enables them to be performed in real time.

In this regard, the line rate microprocessor 23 computes the key value for the first start pixel (and indicates the value thereof by the signal it applies to the line 27) by computing the actual area (that shown shaded) of the first start pixel that falls within the key picture KP, relative to the whole pixel area. The line rate microprocessor 23 also calculates the gradient of the edge (i.e. tan $\theta$ for the edge E1 in the example of FIG. 13) and indicates the value thereof by the signal it applies to the line 26. Now, as can be understood from examining FIG. 16, and ignoring for a moment the first start pixel and the last of the pixels intersected by the edge E1, the increase in the shaded area (and therefore the increase in the key value) between each successive pair of pixels is identical and, what is more, is directly proportional to the gradient (e.g. tan $\theta$ for the edge E1 in the example of FIG. 13) of the edge. (Specifically, the change in area is equal to $W^2 \cdot \tan \theta$, where W is the pixel width and tan $\theta$ is the gradient). The present key processor, instead of identifying all the pixels intersecting the edge E1 and calculating their respective key values, identifies and calculates the key value for the start pixel only and then, in the key value generator 32, increments the key value for the first start pixel, for pixels following the first start pixel, by an amount per pixel determined by the gradient of the first edge, until the key value has been ramped up or incremented to unity. The fact that only this small number of calculations is effected enables them to be carried out within a single video signal line period whereby the apparatus can process the signal in real time.

For the following reason, the foregoing technique, if carried out exactly as so far described, is slightly approximate. Thus, as will be appreciated from a careful study of FIGS. 15 and 16, unless the point I happens to coincide precisely with a boundary between two adjacent pixels in the row the changes in shaded area (and therefore the changes in key value) between the start pixel and the following pixel, and between the last two pixels intersected by the edge E1, will be different than the identical change between the other successive pairs of pixels intersected by the edge E1. Furthermore, consequentially thereto, the pixel in the row identified (by virtue of its incremented key value having reached unity) as being the first falling wholly within the key picture KP may not coincide precisely with the first pixel actually falling wholly within the key picture. Nonetheless, the inaccuracy would probably in most cases be subjectively indiscernible or scarcely discernible in the composite picture and, in any event, is a small price to pay to enable the operation to be carried out on a real time basis. However, by using the enhancement of the technique described below, the above inaccuracy my be greatly reduced.

According to the enhancement, each of the microprocessors 23 and 24 calculates (as before) the start pixel location or address and the start key value (the key value of the start pixel) and (as before) produces a start pixel location signal and a start key value signal that represent, respectively, the start pixel location or address and the start key value. Further, as before, each microprocessor 23 and 24 produces a gradient signal. However, the gradient represented by the gradient signal is adapted slightly with respect to the actual gradient of the relevant one of the edges E1 to E4 of the key picture in such a manner as to take account of the exact position at which the edge crosses the row of pixels and thereby to compensate at least partially for the above-mentioned possible slight inaccuracy.

Each of the microprocessors 23 and 24 calculates the adapted value for the gradient as follows. As well as calculating the start pixel location and start key value, it calculates an end pixel location or address and an end key value, namely the location or address and key value of that pixel ("the end pixel") in the row of pixels corresponding to the current scanning line in which the intersection of the relevant edge of the key picture with the row ends. (The end pixel location and end key value can be calculated in a manner exactly analogous to that in which the start pixel location and start key value are calculated ). Further, each of the microprocessors 23 and 24 calculates the difference between the start and end pixel locations, i.e. the number N of pixels over which the key value has to be incremented (or decremented) from the start key value. (Thus, in the case of ( for example) FIG. 15, the line rate microprocessor 23 additionally calculates a first end key value by calculating the area of the first end pixel, and subtracts the locations or addresses of the first start and end pixels to provide the number N, which is equal to 6 in the case of FIG. 15.) Then, each of the microprocessors 23 and 24 produces the adapted gradient by calculating the difference between the start and end key values and dividing the difference by the number N. The resultant adapted gradient is precisely equal to the actual gradient of the relevant edge of the key picture if the edge happens to cross the row of pixels exactly on boundaries between adjacent pixels. Otherwise, it differs slightly from the gradient in a sense that takes account of the actual position (to sub-pixel accuracy) at which the edge crosses the row of pixels to take account of the fact that the change in key values between the start pixel and the next pixel, and between the end pixel and the preceding pixel, differs from the change between other pixels (if any). Thus, when such an adapted gradient is used, in place of the actual gradient, to produce one or both of the gradient signals outputted by the line rate microprocessors 23 and 24 in the apparatus of FIG. 14, the above-mentioned slight inaccuracy is greatly reduced.

As will be evident, the above-described enhancement increases the amount of processing that has to be performed in the line rate microprocessors 23 and 24 for every scanning line. Nonetheless, a sufficient processing speed has been found achievable with state of the art microprocessors, at least when the usage of the enhancement is limited as explained below.

As should by now be evident, the extent of the above-mentioned slight inaccuracy (in the absence of the above-described enhancement) will depend upon the number of pixels crossed by the relevant edge of the key picture and therefore upon the gradient of that edge. Thus, for a small gradient ( in which the edge crosses many pixels ) the inaccuracy will in general be negligible, whereas for a larger gradient in which the edge crosses, say, 2 or 3 pixels the inaccuracy is more likely to be discernible whereby the enhancement is, in this ease, of more value. Preferably, therefore, the enhancement is employed only when the gradient of the relevant edge exceeds (as determined in the relevant line rate microprocessor) a predetermined limit stored in the line rate microprocessors 23 and 24. The predetermined limit may, for instance, be about 0.1, whereby the unenhanced technique is used for gradients of less than about 0.1 (when more than 10 pixels are crossed by an edge) and the enhanced technique is used for gradients of more than about 0.1 (when 10 or fewer pixels are crossed by an edge).

When the gradient is greater than 1.0 (i.e. $\theta > 45°$ whereby $\tan \theta > 1.0$), the edge will cross either one pixel or two pixels. FIG. 17 shows a ease in which the edge E1 (say) has a gradient of more than 1.0 and crosses one pixel (the first start pixel) only. That is, the edge E2 both starts to intersect and finishes intersecting the row of pixels corresponding to the line L2 in that one pixel. Nonetheless, the apparatus functions as before. Thus, in the ease of FIG. 17, a key value between zero and unity (specifically, the first start pixel key value) is generated only for the first start pixel, the key value being ramped up to unity in the immediately following pixel. In a case such as that of FIG. 17, where the edge crosses one pixel only, the value of the above-mentioned number N will be zero. To prevent this giving rise to a nonsensical value for the adapted gradient, which is computed by dividing the different between the start and end key values by the number N, a suitable corrective measure (such as limiting the minimum value of N to unity) may be taken.

To summarize the above-mentioned preferred form of implementation of the apparatus of FIG. 14, the unenhanced technique is used for gradients of less than (say) about 0.1 and the enhanced technique is used for gradients of greater than about (say) 0.1. Thus, the gradient signal produced by each of the line rate microprocessors 23 and 24 represents the exact gradient of the relevant edge of the key picture KP where the gradient is less than (say) about 0.1, and represents the adapted gradient (which differs slightly from the exact gradient by an amount corresponding to where, to sub-pixel accuracy, the edge crosses the row of pixels) where the gradient is greater than (say) about 0.1.

Limitation of the range of gradient values over which the enhanced technique is used may, for the following reason, ease the processing burden on the line rate microprocessors 23 and 24. If the enhanced technique is used for gradients of greater than (say) 0.1, the value of the above-mentioned N (the number of pixels over which the key value has to be incremented or decremented) will range from about 10 down to 1. As explained above, the difference between the start and end key values has to be divided by the number N. In practice, the line rate microprocessors 23 and 24 may operate faster if they instead multiply the difference by 1/N. To further increase speed, the line rate microprocessors 23 and 24 may comprise look-up tables storing a value of 1/N for each possible value of N, whereby 1/N does not have to be calculated. The use, therefore, of a limited possible range of values for N makes this approach more feasible in that It reduces the number of values of 1/N that have to be stored.

Whatever combination of the enhanced and unenhanced techniques is used, or even if only the enhanced technique is used, account has to be taken of the fact that as the relevant edge approaches the vertical, the gradient approaches infinity. (That is, as $\theta \rightarrow 90°$, $\tan \theta \rightarrow \infty$). Each of the line rate microprocessors 23 and 24 therefore will compute the gradient of the relevant edge in such a manner as to limit the gradient to a maximum value corresponding to the edge being inclined to the horizontal by an angle approaching 90°.

Reverting to the description of operation of the key processor of FIG. 14, it will be recalled that intersection of the edge E1 of the key picture KP with the row of pixels corresponding to the line L2 has been completed and the ALU 34 is in a static state in which, since the key picture KP has been entered, it outputs key values of unity for successive pixels. Also, the switch 38 has been changed over whereby the second gradient signal, produced on the line 29 by the second line rate microprocessor 24, is applied to the ALU 34.

When the second address comparator 44 indicates to the sequencer 36 by a signal on the line 56 that the current pixel is the second start pixel, the sequencer causes the ALU 34 to go into the other state. The ALU 34 loads the second key value represented by the second start key value signal on the line 30 and, for the current pixel (the second start pixel), outputs a key value equal to that represented by the second start key value signal. Then, for each successive pixel, the ALU 34 ramps down the key value by decrementing it by a predetermined amount per pixel whose magnitude is determined by the gradient of the edge E2 as indicated by the second gradient signal. Each such successive pixel key value outputted by the ALU 34 on the line 62 is passed via the comparator and clip circuit 46 to the line 64 and thence to the mixer 7, whereby the key value for the successive pixels is decremented towards zero as the location of the current pixel, intersecting the edge E2, goes further towards the background picture B, whereby jaggedness/aliasing of the composite picture at the edge E2 is subjectively substantially wholly suppressed and a hard edge is obtained. Each such successive pixel key value is compared in the comparator and clip circuit 46 with the above-mentioned zero and unity reference key values. When that comparison operation indicates that the key value has been ramped down (i.e. been decremented) to zero by the ALU 34, signifying that the key value generator 32 believes that the current pixel is located wholly within the background picture B whereby the intersection of the edge E2 has been completed and no further decrementation of the key value is needed, the signal representative thereof on the line 58 causes the sequencer 36 to control the ALU 34 (via the line 60) to put it back in its static state in which it provides a fixed key value output of zero for succeeding pixels and perform no arithmetical operations. The ALU 34 remains in this state for the rest of the line L2. The sequencer 36 is also responsive to the signal on the line 58 to change over the switch 38 back to its illustrated condition, ready for the next scanning line.

Figure 18:
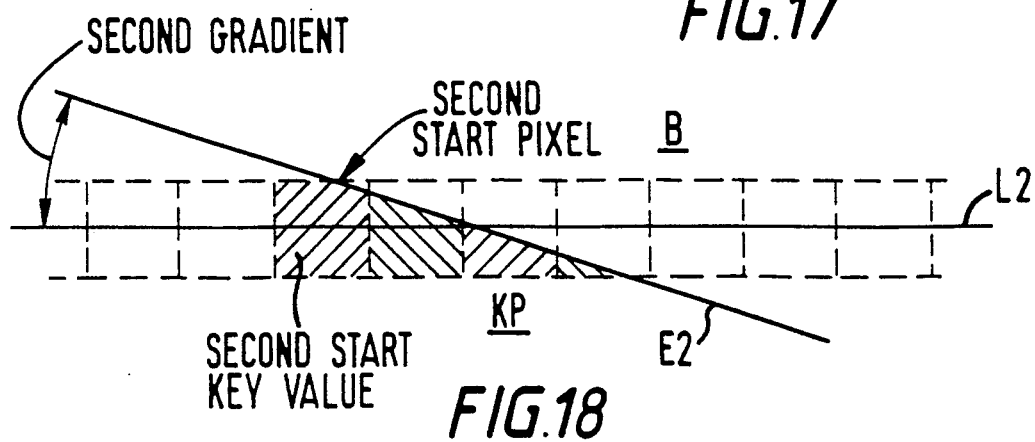
FIG. 18 shows the intersection of a second edge of the key picture with the same row of pixels shown in FIG. 15.

The above-described process of ramping down or decrementation of the key value when the pixels corresponding to the line L2 are intersected by the edge E2 is illustrated in FIG. 18 and is carried out in a manner which is precisely analogous to that in which the key value is ramped up or incremented when the pixels corresponding to the line L2 are intersected by the edge E1. Thus, the line rate microprocessor 24 calculates the location of the second start pixel, the key value (area shaded in FIG. 18) of the second start pixel and the gradient (or adapted gradient) of the edge E2, and the key value generator 32 decrements the second start pixel key value towards zero in a manner exactly analogous to that in which it previously incremented the first start pixel towards unity.

The foregoing description of operation of the key processor of FIG. 14 referred to the line L2 that intersects the edges E1 and E2 of the key picture KP. As was explained above, in other regions of the key picture KP a scanning line will intersect with different pairs of the edges E1 to E4 of the key picture KP.

Figure 19:
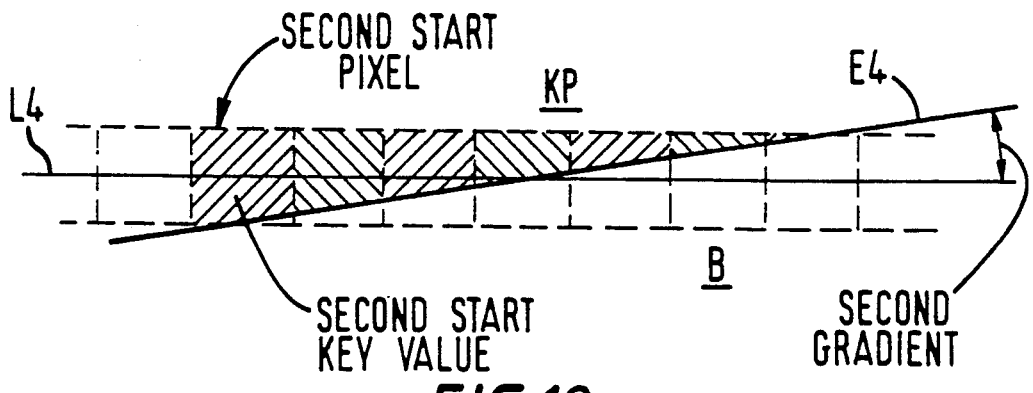
FIG. 19 is a view corresponding to FIG. 18, but for a different scanning line.

Thus, the line L4 (between the lines L3 and L5) intersects the edges E1 and E4. The intersection of the line L4 with the edge E1 will be similar to that of the line L2 with the edge E1, as represented in FIGS. 15 and 16. The intersection of the line L4 with the edge E4 is represented in FIG. 19. It will be seen from FIG. 19 that, although the sense of the gradient of the edge E4 is opposite to that of the edge E2 in FIG. 18, it is nonetheless still necessary to decrement the key value as from the second start pixel whereby, in the case of the line L4, the decrementation operation performed by the key value generator 32 in response to the signals generated by the second line rate microprocessor 24 is the same as that performed in the case of the line L2, though the information contained in the signals from the microprocessor 24 is, of course, different, and relates to the edge E4 rather than the edge E2.

Figure 20:
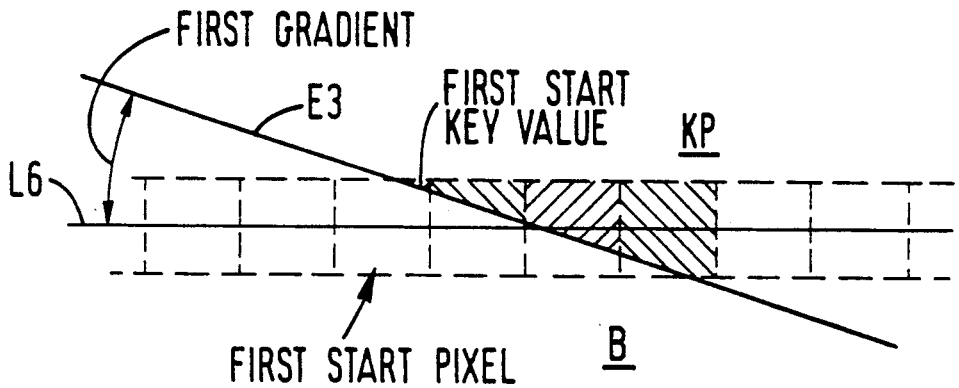
FIG. 20 is a view corresponding to FIG. 15, but for yet another scanning line.

Further, in another region of the key picture KP between the lines La and L7, the line L6 (for example) intersects the edges E3 and E4. In this case, the first and second intersections are as represented in FIGS. 20 and 19, respectively, and it will be seen from FIG. 20 that, although the sense of the gradient of the edge E3 is opposite to that of the edge E1 in FIG. 15, it is nonetheless still necessary to increment the key value as from the first pixel whereby, in the case of the line L6, the incrementation operation performed by the key value generator 32 in response to the signals generated by the first line rate microprocessor 23 is the same as that performed in the case of the line L2, though the information contained in the signals from the microprocessor 23 is, of course, different, and relates to the edge E3 rather than the edge E1.

As described so far, the key processor enables the key or foreground picture KP to be combined (mixed) with the background picture B so that, in the area of the key picture, only the key picture is visible. However, use of the clipping feature provided (optionally) in the comparator and clip circuit 46 affords the possibility of a variation. Thus, if the key values outputted to the line 64 are clipped to a value less than unity, this will have the effect that, in the area of the key picture KP, the key picture and the background picture B appear mixed or cross-faded together. If, for example, the comparator and clip circuit 46 includes means enabling the clipping level to be increased over successive fields from zero to unity, this will have the effect that the key picture KP is faded up gradually into the background picture B rather than being switched abruptly into the background picture.

It is possible that, in some cases, the first and second line rate microprocessors 23 and 24 could be replaced by a single line rate microprocessor. This would depend on whether a single line rate microprocessor were sufficiently fast to produce, in one line period, the signals provided in the above-described arrangement by the two separate line rate microprocessors.

It was mentioned above (at the beginning of the description of FIGS. 13 through 20) that the key picture KP, namely the picture on the bus 6 leading from the manipulator 3 of the DME generator 1 (FIG. 8) that is keyed into the background picture in the mixer 7, is assumed to be in the form of a manipulated rectangle, that is to be four-sided. While this is generally the case, the key picture as appearing in the combined picture represented by the signal on the bus 9 leading from the mixer 7 can in general be of a variety of shapes (see, for example, FIGS. 3, 4 and 12); and can in some cases be constituted by plural separate picture portions (see, for example, FIGS. 2 and 4). Moreover, the shape of each key picture as appearing in the combined picture represented by the signal on the bus 9 can of course vary during the course of a pass as different parts thereof are hidden by another picture or pictures flying through it. In other words, due to the need to effect hidden surface removal, for at least some of the time during the creation of an effect the key processor is not required only to process a single four-sided key picture as described above. Instead, the key processor may effectively be required, in accordance with the particular edge data for a particular field as produced by the field rate microprocessor 20 of FIG. 14 (edge data generator 12 of FIG. 9) in response to the control data supplied thereto by the control system 2, to process a key picture which is not four-sided and/or to process a plurality of key picture portions. That is, the key processor has to produce key values of zero for pixels corresponding to any hidden surface that is to be removed, thereby possibly defining at least one new edge that does not correspond to an edge of the input key picture to the mixer 7 (the manipulated image or picture prior to hidden surface removal), and, at least if the new edge will correspond to intersecting picture edges in the eventual composite image or picture, has to perform anti-aliasing treatment upon the new edge.

It should be appreciated that the field rate microprocessor 20 and the line rate microprocessors 23 and 24 of the key processor of FIG. 14 can be programmed to deal with other than four-sided key picture shapes (manipulated or unmanipulated rectangles and squares). Thus, the key processor can readily be designed to deal with any shape of key picture (after hidden surface removal) or key picture portion that can be defined by three or more straight or substantially straight edges; that is, any polygonal picture.

To enable the key processor to deal with a variety of shapes, an upstream part of the key processor, for example the field rate microprocessor 20 of FIG. 14 (edge data generator 12 of FIG. 9) or further circuitry following same, my be programmed to determine (from the control data or edge data, which identifies the shape) which of a plurality of shapes the key picture (after hidden surface removal) or a portion thereof best conforms to. Having done this, the upstream part either sends edge data appropriate to the determined shape to the downstream part of the key processor 10 (the line rate microprocessors 23 and 24/line rate information calculator 14 and the key value generator 32/15), if the same downstream part can deal with different shapes, or sends the edge data to the appropriate one of a plurality of such downstream parts each capable of dealing with a respective determined shape. It may be necessary to accept that exact matching of shape for every field during the course of a pass (effect) may not be achievable.

An alternative approach is to break up each key picture (after hidden surface removal) for each field in each pass, or each portion thereof, into a plurality of triangles (which is generally readily possible) and to handle key value generation for each triangle in a respective one of a plurality of downstream parts each capable of dealing with a triangular shape. How this may be achieved will now be described with reference to FIGS. 21 and 22.

Figure 21:
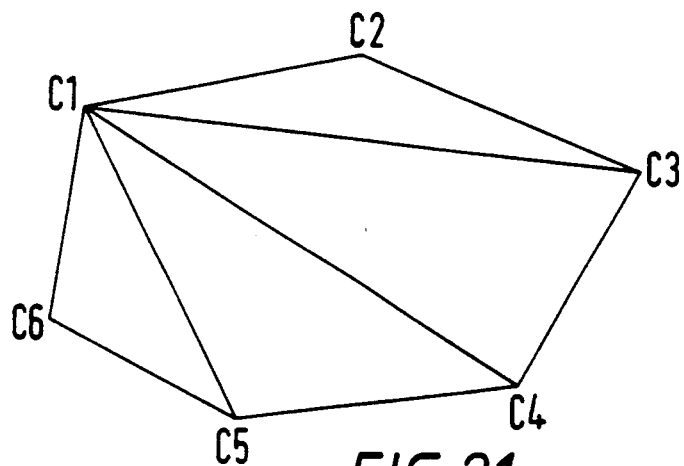
FIG. 21 shows an arbitrary hexagonal key picture.
Figure 22:
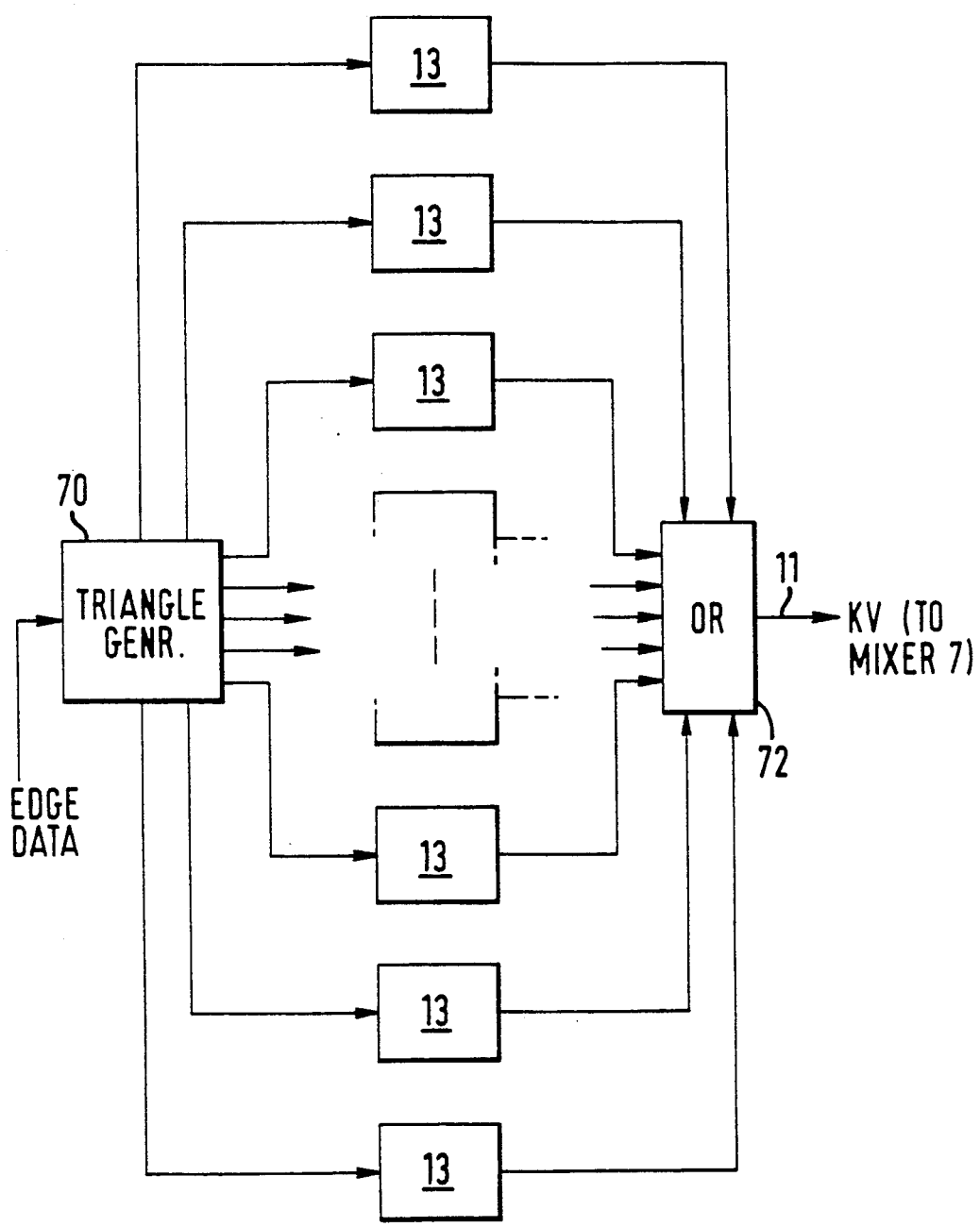
FIG. 22 shows a modified form of key processor.

FIG. 21 shows a key picture (after hidden surface removal) or portion thereof which is, for example, in the form of an arbitrary hexagon, having corners C1 through C6. Edge data defining the edges of the hexagon is generated in the key processor by the field rate microprocessor 20 (FIG. 14) or edge data generator 12 (FIG. 9) and passed to a triangle generator 70 shown in FIG. 22. The triangle generator 70 divides the key picture edge data into triangles in that it outputs individual sets of edge data defining triangles each forming part of the key picture and each having at least one edge of the key picture as an edge thereof. FIG. 21 shows a first example in which, by way of example, the hexagon is divided by the triangle generator 70 into four triangles C1-C2-C3, C1-C3-C4, C1-C4-C5 and C1-C5-C6. In that case, the four triangles cover the whole of the area of the hexagon and do not overlap with one another. However, this is not necessary. Thus, as a second example, it would be possible to use six triangles each having a respective one of the six sides of the hexagon as one edge and having its other two edges extending across the interior of the hexagon to an apex constituted by one of the corners C1 to C6 other than those two at opposite ends of its said one edge. It may in fact be better to use a triangle division technique in which each triangle has one only of the edges of the key picture (after hidden surface removal) or portion thereof as an edge thereof.

The sets of edge data defining triangles as outputted by the triangle generator 70 are supplied to respective ones of a plurality of individual key value computation sections 13 (to four of them in the case of the first example mentioned above and to six of them in the case of the second example mentioned above). Each of the key value computation sections 13 may comprise line rate microprocessors 23 and 24 and a key value generator 32 substantially as described with reference to FIG. 14, except that the microprocessors will be programmed to handle edge data defining three-sided pictures (rather than edge data defining four-sided pictures). Thus, between them, the four or six key value computation sections 13 output key values for the whole of the hexagon. The key values outputted by the four or six key value computation sections 13 are combined by an OR-gate 72 and the resultant key value signal KV is sent via the line 11 to the mixer 7 as before.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating an output video signal representing a composite image of at least first and second images represented by at least first and second input video signals, respectively, in which said first and second images appear to fly through one another, comprising the steps of:

providing first and second data representing desired manipulations of said first and second images, respectively;

manipulating said first image by processing said first input video signal in a digital video effect generator in response to said first data representing a desired manipulation of said first image, thereby generating a processed first input video signal;

recording the processed first input video signal;

manipulating said second image by processing said second input video signal in said digital video effect generator in response to said second data representing the desired manipulation thereof;

removing from the manipulated second image at least one portion thereof which is hidden in said composite image, in response to said first and second data, thereby generating a processed second input video signal;

reproducing the recorded processed first input video signal, thereby generating a reproduced processed first input video signal; and keying the processed second input video signal and the reproduced processed first input video signal, thereby generating said output video signal representing the composite image.

2. A method according to claim 1, further comprising the steps of providing key data, and combining, in response to said key data, predetermined portions of said processed second input video signal with portions of at least one other video signal representing another image forming a part of said composite image where at least one edge of said second image intersects said another image in said composite image, so as to reduce aliasing of the processed second image.

3. A method according to claim 2, wherein said step of combining comprises:

generating for one of a frame and a field of said processed second input video signal, from said first and second data representing the desired manipulation of the first and second images, edge data defining the edges of a polygonal area forming at least a part of said second image;

generating from said edge data, for each of a plurality of horizontal scanning lines of said composite image in which a row of pixels corresponding thereto is intersected by edges of said polygonal area, information representing horizontal locations of first and second start pixels at which first and second edges, respectively, of said polygonal area start to intersect said row of pixels; gradients of said first and second edges; and a start key value for each of said first and second start pixels indicating a predetermined proportion of said second image to said composite image contained in said first and second start pixels, respectively;

generating, in response to said information, for each of said plurality of horizontal scanning lines, a respective key value for each successive pixel in said row of pixels corresponding thereto, by: (a) assigning a key value of zero to pixels preceding said first start pixel, (b) for each successive one of the pixels following said first start pixel, assigning a key value thereto by incrementing key values thereof from the start key value of said first start pixel by an amount per pixel determined by the gradient of the first edge, until the key value thereof reaches unity; and (c) for each successive one of the pixels following said second start pixel, assigning a key value thereto by decrementing key values thereof from the start key value of said second start pixel by an amount per pixel determined by said gradient of said second edge, until the key value thereof reaches zero; and using the generated key values to control keying of said processed second input video signal into a background signal.

4. A method according to claim 3, wherein the step of generating edge data comprises generating edge data defining the edges of each of a plurality of triangular areas each forming a portion of said second image, the step of generating said information from said edge data comprises generating said information for each of said plurality of triangular areas, the step of generating key values comprises generating key values for each of said plurality of triangular areas in response to the information generated for each thereof, and the key step of using the generated key values to control keying of said processed second input video signal into a background signal comprises combining the generated key values to form combined key values to control keying of said processed second input video signal into said background signal.

5. A method according to claim 4, wherein the step of generating said information representing gradients of said first and second edges comprises, for each of said first and second edges:

generating information that represents an actual gradient for said each of said first and second edges when the gradient of said each of said first and second edges is less than a predetermined limit value; and when the gradient of said each of said first and second edges is greater than said predetermined limit value, generating information that represents an adapted gradient by determining the horizontal location of an end pixel of the row of pixels corresponding to said each of said plurality of horizontal scanning lines at which the edge stops intersecting the row, determining a key value for said end pixel, and determining a difference between the key values for the respective one of said first and second start pixels corresponding to said edge and said end pixel and dividing said difference by a horizontal difference between the horizontal locations of the start and end pixels.

6. A method according to claim 5, wherein said predetermined limit value of the actual gradient determined on a per pixel basis is about 0.1.

7. A method according to claim 6, wherein the step of dividing the key value difference by said horizontal difference is effected by multiplying said key value difference by a reciprocal of said horizontal difference obtained from a look-up table storing a respective reciprocal value for each of a plurality of values of said horizontal difference.

8. A method according to claim 5, wherein the step of dividing the key value difference by said horizontal difference is effected by multiplying said key value difference by a reciprocal of said horizontal difference obtained from a look-up table storing a respective reciprocal value for each of a plurality of values of said horizontal difference.

9. A method according to claim 3, wherein the step of generating, for said each of said plurality of horizontal scanning lines, said information representing gradients of said first and second edges comprises, for each of said first and second edges:

generating information that represents an actual gradient for said each of said first and second edges when the gradient of said each of said first and second edges is less than a predetermined limit value; and when the gradient of said each of said first and second edges is greater than said predetermined limit value, generating information that represents an adapted gradient by determining a horizontal location of an end pixel of the row of pixels corresponding to said each of said plurality of horizontal scanning lines at which the edge stops intersecting the row, determining a key value for each end pixel, and determining a difference between the key values for the respective one of said first and second start pixels corresponding to said edge and said end pixel and dividing said difference by a horizontal difference between horizontal locations of the start and end pixels.

10. A method according to claim 9, wherein said predetermined limit value of the actual gradient determined on a per pixel basis is about 0.1.

11. A method according to claim 10, wherein the step of dividing the key value difference by said horizontal difference is effected by multiplying said key value difference by a reciprocal of said horizontal difference obtained from a look-up table storing a respective reciprocal value for each of a plurality of values of said horizontal difference.

12. A method according to claim 9, wherein the step of dividing the key value difference by said horizontal difference is effected by multiplying said key value difference by a reciprocal of said horizontal difference obtained from a look-up table storing a respective reciprocal value for each of a plurality of values of said horizontal difference.

* * * * *